(No Model.)

C. E. BERTELS.
AXLE NUT.

No. 371,663. Patented Oct. 18, 1887.

Witnesses.
Robt. D. Weaver
E. C. [illegible]

Inventor,
Charles E. Bertels
per
[illegible]
his Attorney.

UNITED STATES PATENT OFFICE.

CHARLES ELMAR BERTELS, OF WILKES-BARRÉ, PENNSYLVANIA.

AXLE-NUT.

SPECIFICATION forming part of Letters Patent No. 371,663, dated October 18, 1887.

Application filed July 16, 1887. Serial No. 244,556. (No model.)

*To all whom it may concern:*

Be it known that I, CHARLES ELMAR BERTELS, a citizen of the United States, residing at Wilkes-Barré, in the county of Luzerne and State of Pennsylvania, have invented certain new and useful Improvements in Axle-Nuts; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain improvements in the nuts employed on the axles of vehicles for confining the hub of the wheel thereon; and it has for its object to provide for tightening the hub on the axle from time to time and compensate for the wear of the washer, so as to prevent endwise motion of the hub on the axle and the disagreeable rattling consequent thereupon. These objects I attain by the means illustrated in the accompanying drawings, in which—

Figure 1:
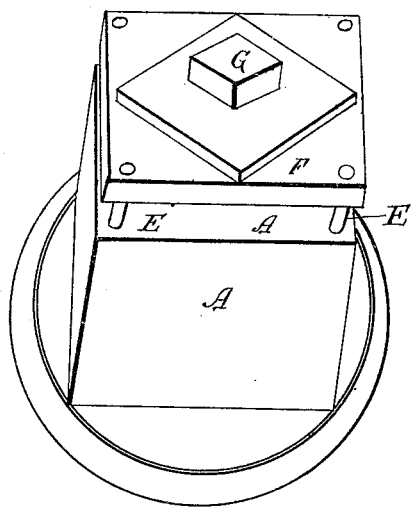
Figure 2:
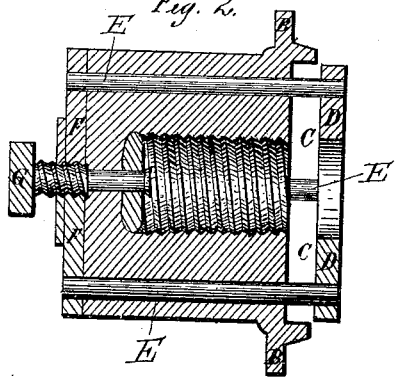

Figure 1 represents a perspective view of a nut constructed according to my invention, and Fig. 2 a sectional view of the same.

Referring to the drawings, letter A indicates a nut which is screw-threaded internally to fit over the screw-threaded end of the axle. The inner end of said nut is provided with an annular flange, B, and inside of the flange with an annular recess, C, in which fits a movable ring, D, for the purpose hereinafter explained. The ring is secured to a series of short rods, E, which pass through longitudinal holes in the nut and are adapted to slide therein. The outer ends of said rods are fastened to a plate, F, at the outer end of the nut. The said plate is perforated centrally and screw-threaded. Through the screw-threaded perforation passes a headed screw, G, the lower end of which passes through an opening at the outer end of the nut and is riveted thereto, so as to turn freely, in the manner of a swivel, in said aperture without pulling out. The head of said screw is squared for the reception of a suitable key by which it may be turned.

The nut is secured to the spindle outside of the hub in the usual manner, a washer of leather or other suitable material being interposed between the ring and the hub. As the washer wears by use, the ring may be forced inward from time to time, thus keeping the nut perfectly tight, the screw being properly turned for the purpose.

Having thus described my invention, what I claim, and desire to secure by Letters Patent, is—

The combination of an axle-nut having plate D, fitted into and working in a recess, which plate is connected by rods E with plate F, which latter plate is engaged and operated by swiveled bolt G, all substantially as set forth and specified.

In testimony whereof I affix my signature in presence of two witnesses.

CHARLES ELMAR BERTELS.

Witnesses:
FRANK C. WATERS,
G. C. SCOTT.